(12) United States Patent
Krishnamurthy et al.

(10) Patent No.: US 6,275,614 B1
(45) Date of Patent: *Aug. 14, 2001

(54) METHOD AND APPARATUS FOR BLOCK CLASSIFICATION AND ADAPTIVE BIT ALLOCATION

(75) Inventors: Ravi Krishnamurthy, Princeton; Sriram Sethuraman, Hightstown, both of NJ (US)

(73) Assignees: Sarnoff Corporation, Princeton, NJ (US); LG Electronics, Inc., Seoul (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/295,878

(22) Filed: Apr. 21, 1999

Related U.S. Application Data

(60) Provisional application No. 60/090,813, filed on Jun. 26, 1998.

(51) Int. Cl.[7] .............................. G06K 9/00; G06K 9/62; H04N 1/40; H04N 7/12; H04B 1/66
(52) U.S. Cl. ..................... 382/224; 382/115; 382/118; 382/133; 382/165; 382/238; 348/384.1; 358/467; 375/240.11
(58) Field of Search ................................. 382/115, 181, 382/224, 232, 236, 118, 133, 165, 225, 238; 348/14.13, 155, 384.1; 358/467; 375/240.12, 240.11

(56) References Cited

U.S. PATENT DOCUMENTS 5,309,232 * 5/1994 Hartung et al. ....................... 348/384
5,412,738 * 5/1995 Brunelli et al. ....................... 382/115
5,596,362 * 1/1997 Zhou ....................................... 348/14

FOREIGN PATENT DOCUMENTS

WO 9602895   2/1996   (WO).
WO 9837811   9/1998   (WO).

OTHER PUBLICATIONS

Yang, et al. "A Real–Time Face Tracker", IEEE, May 1996, pp. 142–147.*
Schumeyer R P et al: "Region of Interest priority coding for sign language videoconfrerncing" 1997 IEEE First Workshop on Multimedia Signal Processing (CAT. No. 97TH8256), Proceedings of First Signal Processing Society Workshop on Multimedia Signal Processing, Princeton, NJ, USA, Jun. 23–25, 1997, pp. 531–536, XP002116570 1997, New York, USA, IEEE, USA ISBN: 0–7803–3780–8 p. 533, paragraph 2—p. 534, paragraph 2.
Hance G A et al: "Unsupervised color image segmentation: with application to skin tumor borders" IEEE Engineering in Medicine and Biology Magazine, Jan.–Feb. 1996, IEEE, USA, vol. 15, No. 1, pp. 104–111, XP002116671 ISSN: 0739–5175 p. 104, right–hand column, paragraph 3.
International Search Report corresponding to PCT Application PCT/US99/14508.
"A Highly Efficient System for Automatic Face Region Detection in MPEG Video", H. Wang and S–F. Chang, IEEE Transactions on Circuits and Systems for Video Technology, vol. 7, No. 4, Aug. 1997, pp. 615–628.
"A Color–Based Classifier for Region Identification in Video", R. Schumeyer and K. Barner, SPIE Proceedings, voll 3309, Jan. 1999, pp. 189–200.

* cited by examiner

*Primary Examiner*—Leo Boudreau
*Assistant Examiner*—Daniel G. Mariam
(74) *Attorney, Agent, or Firm*—William J. Burke (57) ABSTRACT

Apparatus and method for classifying regions of an image, based on the relative "importance" of the various areas and to adaptively use the importance information to allocate processing resources, e.g., bit allocation in an encoding environment.

23 Claims, 4 Drawing Sheets

| 511 S | 512 NS | 513 S | NS | NS |
| --- | --- | --- | --- | --- |
| S | 514 S | 515 NS | NS | NS |
| S | S | 516 S | NS | NS |
| NS | NS | NS | NS | NS |
| NS | NS | NS | NS | 517 S |

METHOD AND APPARATUS FOR BLOCK CLASSIFICATION AND ADAPTIVE BIT ALLOCATION

This application claims the benefit of U.S. Provisional Application No. 60/090,813 filed Jun. 26, 1998, which is herein incorporated by reference.

The invention relates generally to a system for processing images and, more particularly, to an apparatus and a method for classifying regions (e.g., blocks or macroblocks) of an image, based on the relative "importance" of the various areas. In turn, the importance information is employed to implement adaptive bit allocation in an encoding environment.

BACKGROUND OF THE INVENTION

An image sequence, such as a video image sequence, typically includes a sequence of image frames or pictures. The reproduction of video containing moving objects typically requires a frame speed of thirty image frames per second, with each frame possibly containing in excess of a megabyte of information. Consequently, transmitting or storing such image sequences requires a large amount of either transmission bandwidth or storage capacity. To reduce the necessary transmission bandwidth or storage capacity, the frame sequence is compressed such that redundant information within the sequence is not stored or transmitted. Television, video conferencing and CD-ROM archiving are examples of applications, which can benefit from efficient video sequence encoding.

Additionally, in an image processing environment where processing resources are limited or constrained by the requirements of a particular application, it is necessary to carefully allocate the available coding bits. For example, in real-time application such as videophone, the talking person's face is typically one of the most important part of an image sequence. Additional "important" regions may include edges or boundaries between distinctive objects For example, the encoding system in a low bit rate application (e.g., real-time application) must efficiently allocate limited bits to address various demands, i.e., allocating bits to code motion information, allocating bits to code texture information, allocating bits to code shape information, allocating bits to code header information and so on. At times, it may be necessary to allocate available bits such that one parameter will benefit at the expense of another parameter, i.e., spending more bits to provide accurate motion information at the expense of spending less bits to provide texture information. Without information as to which regions in a current frame are particularly important, i.e., deserving of more bits from a limited bit pool, the encoder may not allocate the available bits in the most efficient manner.

Therefore, there is a need in the art for an apparatus and a method for classifying regions of an image, based on the relative "importance" of the various areas and to adaptively use the importance information to implement bit allocation in an encoding environment.

SUMMARY OF THE INVENTION

An embodiment of the present invention is an apparatus and method for classifying regions of an image as important, based on the presence of a human skin-tone, i.e., a skin-tone detector. For example, in videophone applications, the talking person's face is identified as an important region of the frame in an image sequence. The detection of "facial blocks" in a frame is conducted in the chrominance plane. The resulting importance information for the entire image is then collected and represented in an "importance map" or "class map".

Additionally, other parameters can be used or combined with the skin-tone detector in the generation or refinement of the importance map. Namely, an edge detector for detecting edges of objects in a frame and a motion detector for detecting motion of blocks in a frame can be collectively evaluated to generate the importance map. Furthermore, additional importance information may include temporal importance information, e.g., using the importance map of a previous frame.

Once the importance information is made available, the present invention allocates coding bits in accordance with the importance information. In one embodiment, more bits are allocated to "important" regions as compared to the less "important" regions, so that the important regions are coded with a higher degree of quality. Thus, the relative "importance" of the various areas of a frame is rapidly classified and adaptively used in bit allocation in an encoding environment, e.g., an image encoder.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
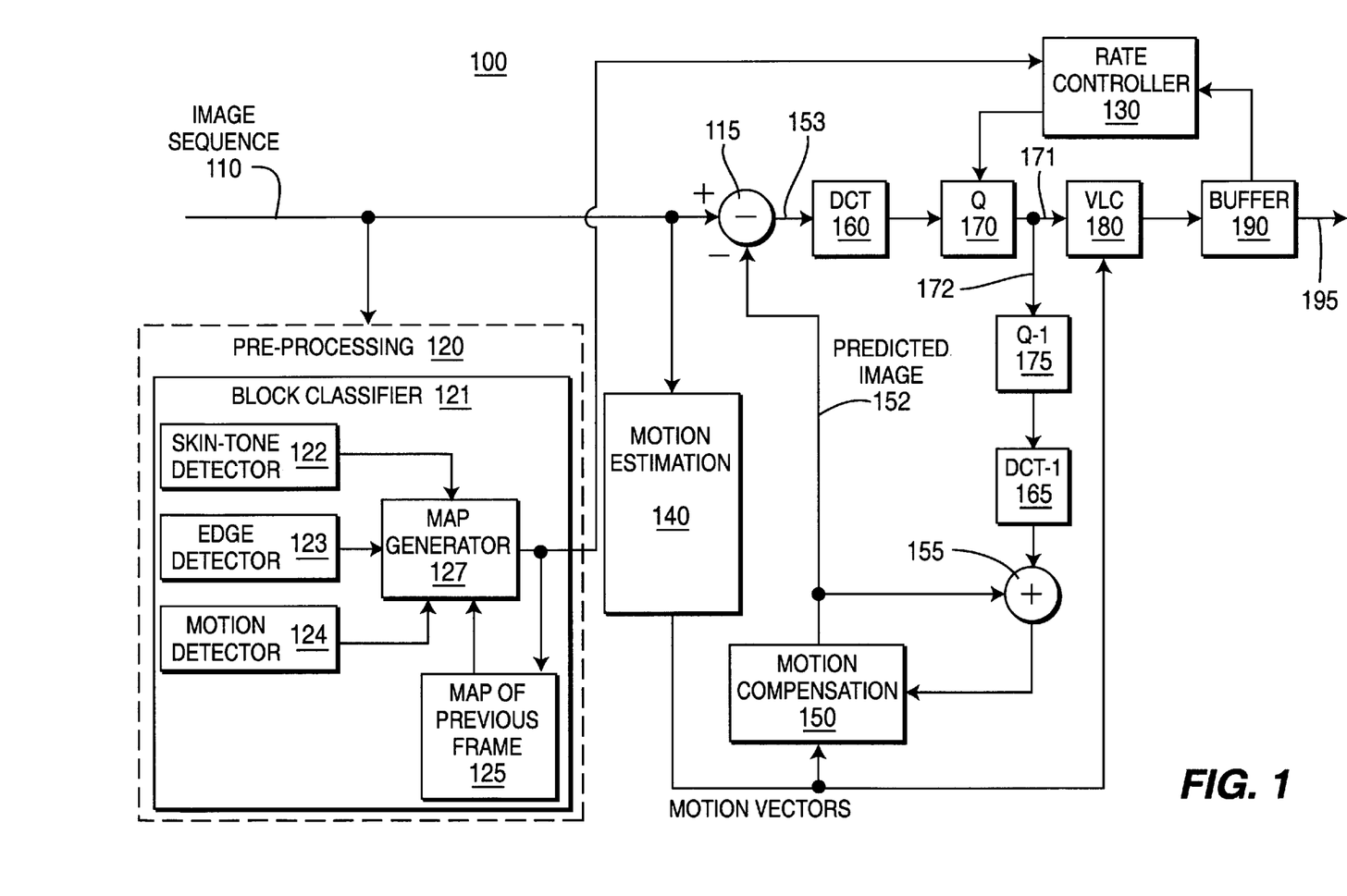
FIG. 1 illustrates a block diagram of the encoder of the present invention for classifying regions of an image, based on the relative "importance" of the various areas and to adaptively use the importance information to allocate coding bits.

FIG. 1 depicts a block diagram of the apparatus 100 of the present invention for classifying regions of an image, based on the relative "importance" of the various areas and to adaptively use the importance information to allocate coding bits. Although the preferred embodiment of the present invention is described below using an encoder, it should be understood that the present invention can be employed in image processing systems in general. Furthermore, the present invention can be employed in encoders that are in compliant with various coding standards. These standards include, but are not limited to, the Moving Picture Experts Group Standards (e.g., MPEG-1 (11172-*), MPEG-2 (13818-*) and MPEG-4), H.261 and H.263.

The apparatus 100 is an encoder or a portion of a more complex block-based motion compensated coding system. The apparatus 100 comprises a preprocessing module 120, a motion estimation module 140, a motion compensation module 150, a rate control module 130, a transform module, (e.g., a discrete cosine transform (DCT) module or a wavelet transform module) 160, a quantization module (Q) 170, a coder, (e.g., a variable length coding (VLC) module) 180, a buffer 190, an inverse quantization module ($Q^{-1}$) 175, an inverse transform module (e.g., an inverse DCT module or an inverse wavelet transform) 165, a subtractor 115 and a summer 155. Although the encoder 100 comprises a plurality of modules, those skilled in the art will realize that the functions performed by the various modules are not required to be isolated into separate modules as shown in FIG. 1. For example, the set of modules comprising the motion compensation module 150, inverse quantization module 175 and inverse DCT module 165 is generally known as an "embedded decoder".

FIG. 1 illustrates an input image (image sequence) on path 110 which is digitized and represented as a luminance and two color difference signals (Y, $C_r$, $C_b$) in accordance with the MPEG standards. These signals are further divided into a plurality of layers such that each picture (frame) is represented by a plurality of macroblocks. Each macroblock comprises four (4) luminance blocks, one $C_r$ block and one $C_b$ block where a block is defined as an eight (8) by eight (8) sample array.

It should be noted that although the following disclosure uses the MPEG standard terminology, it should be understood that the term macroblock or block is intended to describe a block of pixels of any size or shape that is used for the basis of encoding. Broadly speaking, a "macroblock" or a "block" could be as small as a single pixel, or as large as an entire video frame.

In the preferred embodiment, the digitized input image signal undergoes one or more preprocessing steps in the preprocessing module 120. More specifically, preprocessing module 120 comprises a block classifier 121 for classifying the relative importance of blocks within a frame. The block classifier 121 is used to quickly classify areas (e.g., blocks) as areas of high importance or low importance using one or more detectors to generate an "importance map" or "class map". The importance map can be used to allocate coding bits.

Returning to FIG. 1, the input image on path 110 is also received into motion estimation module 140 for estimating motion vectors. A motion vector is a two-dimensional vector which is used by motion compensation to provide an offset from the coordinate position of a block in the current picture to the coordinates in a reference frame. The use of motion vectors greatly enhances image compression by reducing the amount of information that is transmitted on a channel because only the changes within the current frame are coded and transmitted.

The motion vectors from the motion estimation module 140 are received by the motion compensation module 150 for improving the efficiency of the prediction of sample values. Namely, the motion compensation module 150 uses the previously decoded frame and the motion vectors to construct an estimate (motion compensated prediction or predicted image) of the current frame on path 152. This motion compensated prediction is subtracted via subtractor 115 from the input image on path 110 in the current macroblocks to form an error signal (e) or predictive residual on path 153.

The predictive residual signal is passed to a transform module, e.g., a DCT module 160 or a discrete wavelet transform (DWT). The DCT module then applies a forward discrete cosine transform process to each block of the predictive residual signal to produce a set of eight (8) by eight (8) block of DCT coefficients.

The resulting 8×8 block of DCT coefficients is received by quantization (Q) module 170, where the DCT coefficients are quantized. The process of quantization reduces the accuracy with which the DCT coefficients are represented by dividing the DCT coefficients by a set of quantization values or scales with appropriate rounding to form integer values. By quantizing the DCT coefficients with this value, many of the DCT coefficients are converted to zeros, thereby improving image compression efficiency.

Next, the resulting 8×8 block of quantized DCT coefficients is received by a coder, e.g., variable length coding module 180 via signal connection 171, where the two-dimensional block of quantized coefficients is scanned in a "zig-zag" order to convert it into a one-dimensional string of quantized DCT coefficients. Variable length coding (VLC) module 180 then encodes the string of quantized DCT coefficients and all side-information for the macroblock such as macroblock type and motion vectors into a valid data stream.

The data stream is received into a buffer, e.g., a "First In-First Out" (FIFO) buffer 190 to match the encoder output to the channel for smoothing the bit rate. Thus, the output signal on path 195 from FIFO buffer 190 is a compressed representation of the input image 110, where it is sent to a storage medium or a telecommunication channel.

The rate control module 130 serves to monitor and adjust the bit rate of the data stream entering the FIFO buffer 190 to prevent overflow and underflow on the decoder side (within a receiver or target storage device, not shown) after transmission of the data stream. In one embodiment of the present invention, the process of quantization is adjusted in accordance with the importance information received from the block classifier 121 to effect bit allocation. Namely, quantization is an effective tool to control the encoder to match its output to a given bit rate (rate control), i.e., a higher quantization scale reduces the number of coding bits, whereas a lower quantization scale increases the number of coding bits. Since a different quantization value can be selected for each macroblock, for each sub-block or even for each individual DCT coefficient, the amount of coding bits can be tightly controlled by proper selection of the quantization scale.

Namely, in common image coding standards, changing the quantization parameter or scale, Q, controls the quality in various parts of the image. Thus, one can code different areas of the frame with different Qs in order to reflect the difference in importance of the various areas to the viewer. In the present invention, a method is presented that varies the Q across the frame such that a tight control is maintained on the bits allocated to the frame, and the Qs reflect the relative importance of the blocks. A detailed description of the present adaptive bit allocation method is provided below.

Returning to FIG. 1, the resulting 8×8 block of quantized DCT coefficients from the quantization module 170 is received by the inverse quantization module 175 and inverse DCT module 165 via signal connection 172. In brief, at this stage, the encoder regenerates I-frames and P-frames of the image sequence by decoding the data so that they are used as reference frames for subsequent encoding.

In the present invention, block classifier 121 comprises a skin-tone detector 122, an edge detector 123, a motion detector 124, an importance map or class map generator 127 and a storage 125, e.g., memory, for storing an importance map of a prior frame. In one embodiment, the importance map generator 127 utilizes information from all detectors or modules 122–125 to generate the importance map. However, it should be understood that the present block classifier is not so limited, and that any combination of said detectors or modules 122–125 can be used to generate the importance map.

Skin-tone detector 122 employs a method for detecting skin-tone areas (e.g., skin-tone information such as face, hands and legs and so on) in an image and then applies such detection for macroblock classification. More specifically, the present skin-tone detection method is based on the observation that skin-tone is quite distinctive and can be detected by local measurements of the color and saturation. In particular, the distribution of skin-tone colors in the Cr-Cb plane (a chrominance plane) is used (as shown in FIG. 3), since this data is directly available in most source data (which is stored in YCrCb format).

Figure 3:
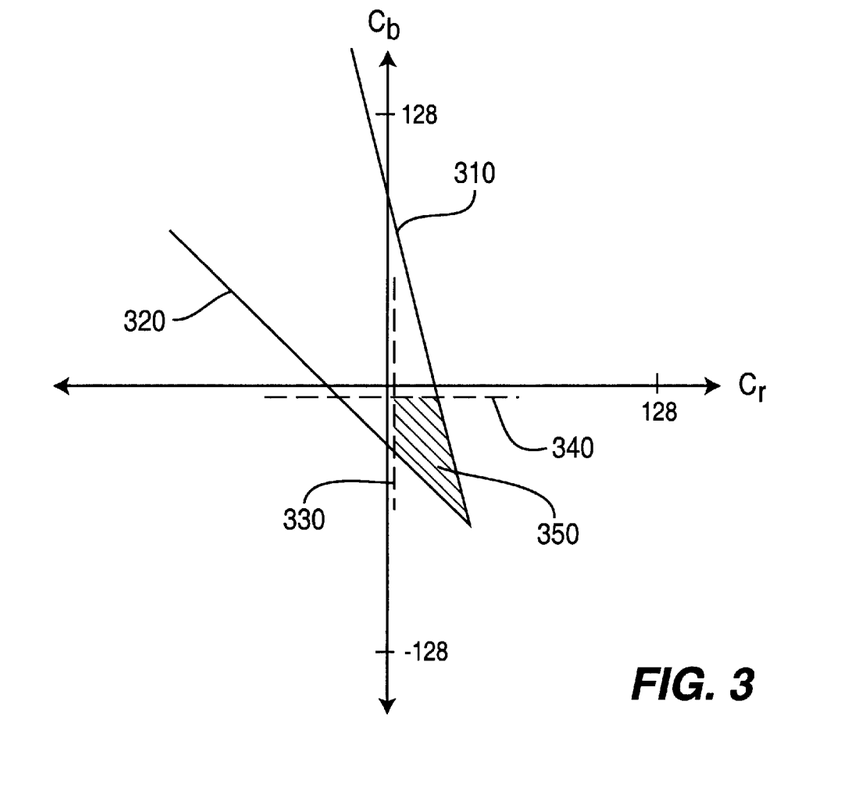
FIG. 3 illustrates a diagram of a chrominance plane having a defined region where skin-tone blocks are likely to be present.

More specifically, FIG. 3 illustrates a diagram of the decision region 350 as shown with cross hatching. Namely, this decision region 350 is defined by a number of straight lines 310, 320, 330, and 340 that enclose a certain area in the chrominance plane. The slope and intercept of the lines 310, 320, 330, and 340 were trained on several training image sequences and the skin-tone detector was then tested on other images. It has been observed that blocks that have corresponding chrominance values that fell within this decision region often contain facial information, thereby allowing the present skin-tone detecting method to classify such blocks as skin-tone blocks. Specifically, the straight lines 310, 320, 330, and 340 can be expressed respectively as follows:

$$C_b \leq -5.7 C_r + 227 \text{(for line 310)} \quad (1)$$

$$C_b \geq -C_r - 10 \text{(for line 320)} \quad (2)$$

$$C_r \geq 3 \text{(for line 330)} \quad (3)$$

$$C_b < -1 \text{(for line 340)} \quad (4)$$

The defined decision region 350 is intended to encompass skin-tones of different races and to cover many different illuminations. It should be noted that the slopes and intercepts of these four lines can be varied slightly while still adequately defining the decision region. The R, G, B, $C_r$ and $C_b$ values are obtained as averages over M×M blocks, and each block is classified as a skin-tone (S) or as not a skin-tone (NS). Typical block-sizes are 8×8 and 4×4. It should be noted that if the chroma-format is 4:2:0, the corresponding block-size in the $C_r$, $C_b$ data will be 4×4 and 2×2 respectively, which is the usual situation with low bit-rate H.263/H.263+ coders.

In one embodiment, in order to improve the performance, a constraint based on the saturation is added that constrains the R-component to be larger than the G-component and B-component by a small factor.

This factor can be expressed as follows:

$$R \geq 1.05 G \quad (5)$$

$$R > 1.25 B \quad (6)$$

This reflects the fact that skin-tones have a greater amount of red. The distribution in the $C_r$–$C_b$ plane also illustrates that skin-tones have very little blue. It should be noted that this additional modification implicitly uses the luminance information in the skin-tone detector.

Once all the blocks in a frame are classified as "skin-tone block" or non-skin tone block", the skin-tone detector 122 then applies additional classification at a higher level, i.e., at the macroblock level. Namely, a macroblock is declared "important", if at least one of its sub-blocks is classified as a skin-tone block.

Figure 5:
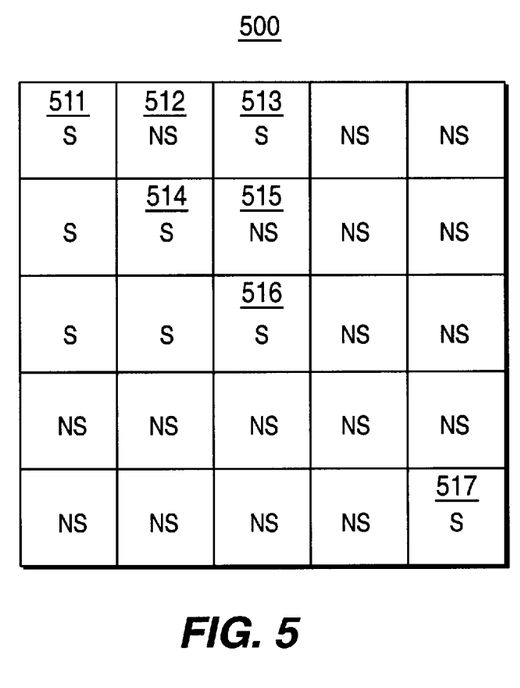
FIG. 5 illustrates a block diagram of a portion of a frame having blocks that are classified as skin-tone blocks and non-skin-tone blocks.

Additionally, once the macroblocks are classified, refinement of the classification is applied. It has been observed that certain features of the face may not be classified as skin-tone, e.g., the eyes of a face. As such, "filling" or "purging" is applied to refine the skin-tone block classification process as shown in FIG. 5.

For example, within a row of macroblocks, if a "non-skin-tone" (NS) macroblock 512 has two adjacent "skin-tone" (S) macroblocks 511 and 513 (left and right), then the macroblock 512 is declared a "skin-tone" macroblock. Similarly, if a "non-skin-tone" macroblock, (e.g., 515) has 3 out of 4 neighbors (e.g., 513, 514, and 516) (top, bottom, left and right) as skin-tone macroblocks, then it is also declared a "skin-tone" macroblock.

The "filling" process serves two important purposes. First, as discussed above, skin-tone detector 122 may not detect certain parts of the face like the eyes and possibly other articles worn about the face such as glasses and the like. Thus, it is important that these blocks are also classified as important.

Second, the filling process also minimizes the number of quantizer changes within a picture or frame. It should be noted that quantizer changes, in and of itself, can be quite expensive at low bitrates. Namely, bits are spend to inform the decoder of the quantization scale changes.

In contrast, a "purging" process is also deployed to remove misclassification of a macroblock. For example, an isolated skin-tone block 517 surrounded by non-skin-tone macroblocks will be reclassified as a non-skin-tone block.

Finally, it should be noted that the filling and purging process can also be implemented at the block level instead of the macroblock level. Additionally, higher level facial classification can be employed, e.g., at the slice level and so on.

Figure 2:
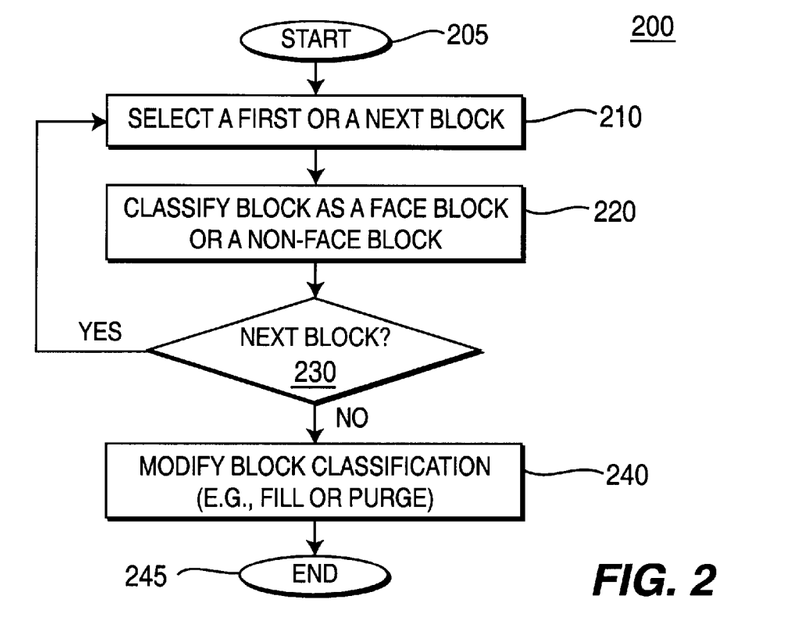
FIG. 2 illustrates a flowchart of a method for detecting and classifying a block as a skin-tone block or a non-skin-tone block.

To summarize, FIG. 2 illustrates a flowchart of a method 200 of the present invention for detecting and classifying a block as a skin-tone block or a non-skin-tone. More specifically, method 200 starts in step 205 and proceeds to step 210, where method 200 selects a first block from a frame for facial classification.

In step 220, method 200 classifies the selected block as either a skin-tone block or a non-skin-tone block in accordance with the decision region as discussed above. Namely, if the corresponding chrominance components of the selected block fall within the decision region, then the block is classified as a skin-tone block. Otherwise, the block is classified as a non-skin-tone block.

In step 230, method 200 queries whether there are additional blocks in the current frame. If the query is affirmatively answered, then method 200 proceeds to step 210 and a next block is selected. If the query is negatively answered, then method 200 proceeds to step 240 where the block classifications are again modified in accordance with filling and/or purging criteria as discussed above. Additionally, higher order classification, e.g., macroblock classification, can also be implemented in this step. Method 200 then ends in step 245.

Returning to FIG. 1, block classifier 121 may also comprise an edge detector 123 for detecting blocks in a frame that carry edges of objects. Since the knowledge of the locations of "edge blocks" can be exploited for various image processing functions, e.g., to improve motion estimation, such "edge blocks" are also considered important. A method for detecting edge blocks is disclosed in U.S. patent application entitled "Apparatus And Method For Employing M-Ary Pyramids To Enhance Feature-Based Classification And Motion Estimation", filed Dec. 31, 1997 with Ser. No. 09/002,258, which is commonly owned by the present assignee and is herein incorporated by reference. Thus, the overall importance map of the block classifier can be generated or refined using the edge block information from the edge detector 123 as further described below.

Block classifier 121 may also comprise a motion detector 124 for detecting blocks in a frame that have moved relative to a prior frame. Such motion knowledge can be exploited for various image processing functions, e.g., allocating more bits to the moving blocks. A method for detecting moving blocks is also disclosed in U.S. patent application entitled "Apparatus And Method For Employing M-Ary Pyramids To Enhance Feature-Based Classification And Motion Estimation". Again, the overall importance map of the block classifier can be generated or refined using the motion block information from the motion detector 124 as further described below.

Block classifier 121 may also comprise a storage 125 for storing an importance map of a prior frame. The block classifier 121 can exploit an importance map of a prior frame for refining the importance map. Namely, this temporal combination of importance-maps allows the detection of uncovered areas near the edge of a face or a moving area and results in improved visual performance. For example, due to the correlation in content between successive frames, it is possible, at times, to anticipate where the important blocks will likely appear in the current frame. One useful example is the emergence of a partially occluded important object. Since part of the object has already been classified as important and motion information may be available, additional blocks of the occluded object can be classified as important as the occluded object moves into view from behind another object. Thus, another benefit of using a prior importance map is the ability to ensure temporal "smoothness" in quality. Again, the overall importance map of the block classifier can be generated or refined using the importance map of a prior frame from storage module 125 as further described below.

Finally, block classifier 121 also comprises a map generator or discriminator 127 for generating the importance map. Map generator 127 receives block classification related information from detectors and modules 122–125 and then generates an overall importance map. In one embodiment, the various inputs from the detectors are weighed as shown in Table 1.

TABLE 1

| Skin-tone Block? | Edge Block? | Motion Block? | Previous Important Block? | Significance Value (SV) |
|---|---|---|---|---|
| Yes | Yes | Yes | Yes | 1.0 |
| Yes | Yes | Yes | No | 1.0 |
| Yes | Yes | No | Yes | 1.0 |
| Yes | Yes | No | No | 1.0 |
| Yes | No | Yes | Yes | 1.0 |
| Yes | No | Yes | No. | 1.0 |
| Yes | No | No | Yes | 1.0 |
| Yes | No | No | No | 0.8 |
| No | Yes | Yes | Yes | 1.0 |
| No | Yes | Yes | No | 1.0 |
| No | Yes | No | Yes | 1.0 |
| No | Yes | No | No | 0.8 |

TABLE 1-continued

| Skin-tone Block? | Edge Block? | Motion Block? | Previous Important Block? | Significance Value (SV) |
|---|---|---|---|---|
| No | No | Yes | Yes | 1.0 |
| No | No | Yes | No | 0.8 |
| No | No | No | Yes | 1.0 |
| No | No | No | No | 0.8 |

Namely, the determination of the significance values of Table 1 can be expressed generally as follows:

If block is classified as "skin-tone", "edge" and "motion", then SV=1.0

If block is classified at least as "skin-tone" and "edge", then SV=1.0     (7)

If block is classified at least as "edge" and "motion", then SV=1.0

If block is classified at least as "skin-tone" and "motion"=1.0

Else, SV=0.8

It should be noted that depending on a particular application, any combination of the above detectors can be employed. As such, the significance value assignment scheme as discussed above is provided as an example.

For example, if only skin-tone and edge detectors are employed then an illustrative significance value assignment scheme can be as follows:

If block is classified as "skin-tone" and "edge", then SV=1.0

If block is classified as "skin-tone" only, then SV=0.8     (8)

If block is classified as "edge" only, then SV=0.8

Else, SV=0.8

Once the overall importance map is generated by the block classifier, the importance map is applied by the encoder to implement adaptive bit allocation. More specifically, the quantization scale, Q, for each macroblock is adjusted in accordance with the importance of the macroblock as follows:

$$Q_i = Q_p(1 + \text{global\_adj} + \text{local\_adj}) \times (\text{Imp\_factor}) \quad (9)$$

where $Q_i$ is a quantization scale for the current macroblock i, $Q_p$ is an average quantization scale over the entire previous picture or frame, global_adj is a global adjustment, local_adj is a local adjustment, and Imp_factor is an importance factor for the current macroblock as derived from the importance map as discussed below. global_adj is represented as:

$$\text{global\_adj} = (B\text{prev} - T)/(2*T) \quad (10)$$

where Bprev is the bits used to encode the previous frame, and T is a target bit rate for the current frame.

The local_adj is calculated based on the deviation between the actual number of bits spent so far in this current frame and the projected number of bits that are expected to have been spent so far. Thus, if an over-spending condition exists, then Q is increased, whereas if an under-spending condition exists, then Q is decreased in order to reach the target bit rate for the current frame. Thus, local_adj is expressed as follows:

$$\text{local\_adj} = k*(\text{actual\_bits\_spent\_so\_far} - \text{projection})/\text{bit-rate}, \quad (11)$$

where k is an empirical constant (e.g., 12), actual_bits_spent_so_far is the number of bits spent up to the present macroblock, "projection" is the number of bits that is projected to have been spent up to the present macroblock, and bit-rate is the rate in bits/second used to encode the sequence. One method of determining "projection" is as follows:

$$\text{projection} = \frac{T}{\sum_{all\ macroblocks} w_i d_i^2} \sum_{i=0}^{current\ macroblock} w_i d_i^2 \quad (12)$$

where, $w_i$ is a weight for macroblock i (where $w_i$ is approximately 1.2 or 1.3 for an important class (e.g., SV greater than 0.6) and 1.0 for less important classes (e.g., SV equal to 0.6)) and is derived from the class-map or significance map, and $d_i$ is a distortion for the macroblock i (after motion compensation and intra/inter mode decision).

The importance factor is used to reflect the relative importance of this macroblock when compared to the macroblocks that are yet to be coded. One method of determining importance factor is as follows:

$$\text{imp\_factor} = \left( \frac{\varepsilon + \mu \sum_{remaining\ mbs} \frac{B_i}{N_{rem}} + B_{curr}}{\varepsilon + \sum_{remaining\ mbs} \frac{B_i}{N_{rem}} + \mu B_{curr}} \right) \quad (13)$$

where $\varepsilon$ is greater than 0 (approximately 0.01), $\mu$ is greater than 1 (approximately 1.2), $N_{rem}$ is the remaining macroblocks in the current frame, $B_i$ is the significance value of the ith macroblock, and $B_{curr}$ is the significance value of the current macroblock, e.g., as stored in the importance map. It should be noted that the above quantizer update need not be executed at each macroblock. Instead, the quantizer is only changed when the block classifier moves from one class to another as the macroblocks are raster-scanned.

However, if the above quantization update method requires a change in Q that is greater than a threshold, e.g., 2, such change should be distributed over more than one macroblock, since some standards, e.g., the H-263, only allow changes in quantization scale by at most 2 in either direction. However, this restriction may not exist depending on the application and the relevant applicable standard. Nevertheless, this selective update serves to minimize the number of quantizer changes within a picture and reduces the overhead information, which can be significant at low bit-rates.

Figure 4:
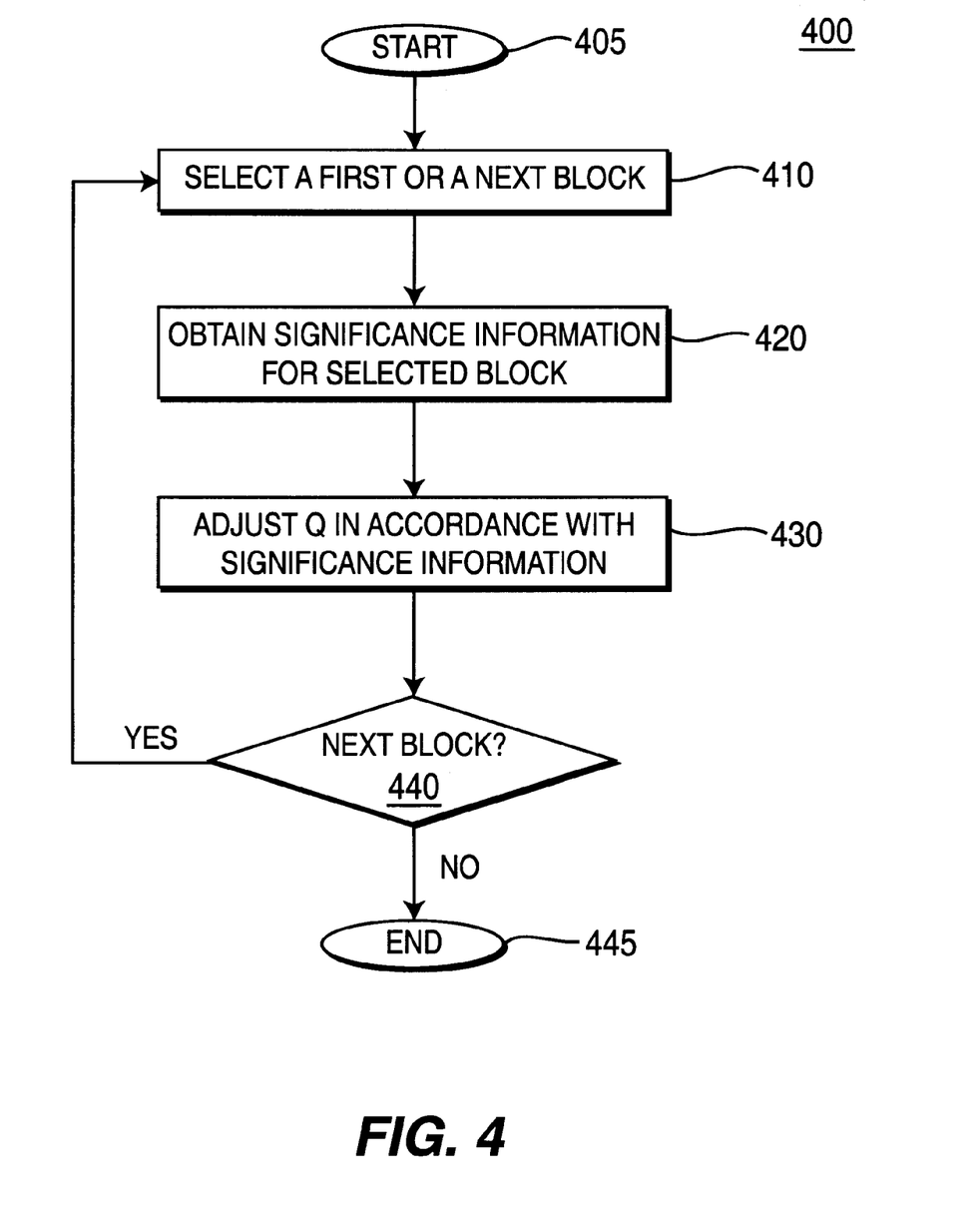
FIG. 4 illustrates a flowchart of a method for applying importance information to adaptively adjust the quantization level or scale for a block.

To summarize, FIG. 4 illustrates a flowchart of a method 400 for applying the importance information to adaptively adjust the quantization level or scale for a block. Method 400 starts in step 405 and proceeds to step 410, where method 400 selects a first block from a frame for bit allocation.

In step 420, method 400 obtains importance information for the selected macroblock as discussed above. Namely, the significance values are obtained from the importance map for the current selected macroblock.

In step 430, the quantization Q is selected for the current macroblock in accordance with the importance information. Namely, the quantization Q is selected in accordance with equation (9) above.

In step 440, method 400 queries whether there are additional blocks in the current frame. If the query is affirmatively answered, then method 400 proceeds to step 410 and a next block is selected. If the query is negatively answered, then method 400 ends in step 445.

Figure 6:
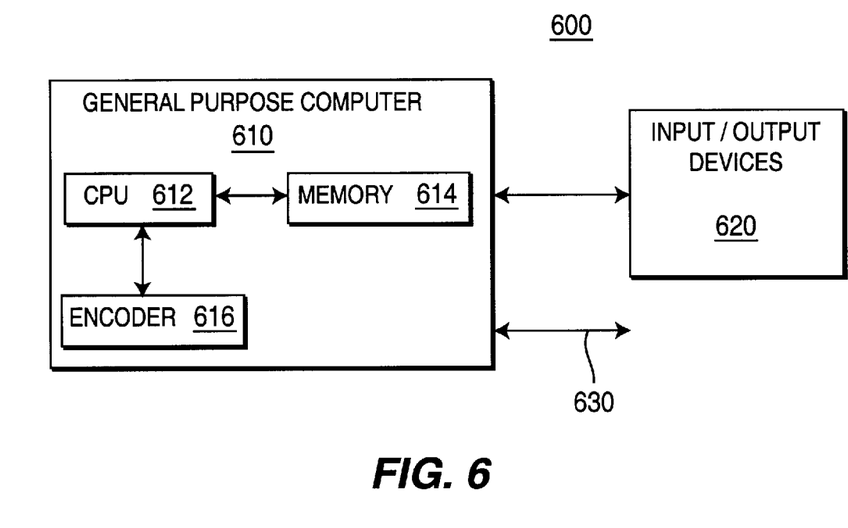
FIG. 6 illustrates an encoding system of the present invention.

FIG. 6 illustrates an encoding system 600 of the present invention. The encoding system comprises a general purpose computer 610 and various input/output devices 620. The general purpose computer comprises a central processing unit (CPU) 612, a memory 614 and an encoder 616 for receiving and encoding a sequence of images.

In the preferred embodiment, the encoder 616 is simply the encoder 100 as discussed above. The encoder 616 can be a physical device which is coupled to the CPU 612 through a communication channel. Alternatively, the encoder 616 can be represented by a software application which is loaded from a storage device, e.g., a magnetic or optical disk, and resides in the memory 614 of the computer. As such, the encoder 100 of the present invention can be stored on a computer readable medium.

The computer 610 can be coupled to a plurality of input and output devices 620, such as a keyboard, a mouse, a camera, a camcorder, a video monitor, any number of imaging devices or storage devices, including but not limited to, a tape drive, a floppy drive, a hard disk drive or a compact disk drive. The input devices serve to provide inputs to the computer for producing the encoded video bitstreams or to receive the sequence of video images from a storage device or an imaging device. Finally, a communication channel 630 is shown where the encoded signal from the encoding system is forwarded to a decoding system (not shown).

Although various embodiments which incorporate the teachings of the present invention have been shown and described in detail herein, those skilled in the art can readily devise many other varied embodiments that still incorporate these teachings.

What is claimed is:

1. A method for classifying a block within a current image of an uncompressed input image sequence, said method comprising the steps of:

(a) mapping a chrominance component of a block in the current image of the uncompressed input image sequence in a chrominance plane;

(b) defining a decision region by four straight lines in said chrominance plane; and (c) classifying said block as a skin-tone block if said chrominance component falls within said decision region.

2. The method of claim 1, wherein said defining step (b) defines said decision region by four straight lines expressed as:

$C_b \leq -5.7 C_r + 227$ $C_b \geq -C_r - 10$ $C_r \geq 3$ $C_b < -1$ where $C_b$ is representative of an ordinate of said chrominance plane and $C_r$ is representative of an abscissa of said chrominance plane.

3. The method of claim 2, further comprising the step of:

(c) applying said skin-tone block to generate an importance map.

4. The method of claim 3, wherein said applying step (c) further comprises the step of:

(c1) using an edge block to generate said importance map.

5. The method of claim 3, wherein said applying step (c) further comprises the step of:

(c1) using a motion block to generate said importance map.

6. The method of claim 3, wherein said applying step (c) further comprises the step of:
(c1) using an importance map of a prior image to generate said importance map of the current image.

7. The method of claim 1, further comprising the step of:
(d) using luminance information to qualify said classifying step (c).

8. A method for allocating coding bits to a block within an image of an uncompressed input image sequence, said method comprising the steps of:
(a) obtaining an importance information for the block within the image, by receiving importance information from a block classifier that maps a chrominance component of said block in the image of the uncompressed input image sequence in a chrominance plane to detect a skin-tone block; and
(b) allocating coding bits to said block in accordance with said importance information.

9. The method of claim 8, wherein said obtaining importance information step (a) further comprises the step of:
receiving importance information from a block classifier for detecting an edge block.

10. The method of claim 8, wherein said obtaining importance information step (a) further comprises the step of:
receiving importance information from a block classifier for detecting a motion block.

11. The method of claim 8, wherein said obtaining importance information step (a) further comprises the step of:
receiving importance information from a block classifier using an importance map of a prior image.

12. The method of claim 8, wherein said allocating step (b) comprises the step of:
(b1) allocating the coding bits in accordance with an importance factor that accounts for a significance of the block.

13. The method of claim 12, wherein said allocating step (1) allocates the coding bits in accordance with:

$$Q_i = Q_p(1 + \text{global\_adj} + \text{local\_adj}) \times (\text{Imp\_factor})$$

where $Q_i$ is a quantization scale for a current macroblock i, $Q_p$ is an average quantization scale over an entire previous frame, global_adj is a global adjustment, local_adj is a local adjustment, and Imp_factor is said importance factor for said current macroblock.

14. The method of claim 12, wherein said importance factor is expressed as:

$$\text{imp\_factor} = \left( \frac{\varepsilon + \mu \sum_{\text{remaining mbs}} \frac{B_i}{N_{\text{rem}}} + B_{\text{curr}}}{\varepsilon + \sum_{\text{remaining mbs}} \frac{B_i}{N_{\text{rem}}} + \mu B_{\text{curr}}} \right)$$

where $\varepsilon$ is a constant, $\mu$ is a constant, $N_{\text{rem}}$ is a number of remaining blocks, $B_i$ is a significance value of the ith block, and $B_{\text{curr}}$ is a significance value of the current block.

15. The method of claim 12, wherein said allocating step (b) further comprises the step of:
(b2) allocating the coding bits in accordance with a global adjustment that accounts for bits used to encode a previous frame.

16. The method of claim 15, wherein said global adjustment is expressed as:

$$\text{global\_adj} = (B\text{prev} - T)/(2*T)$$

where Bprev is a number of bits used to encode said previous frame, and T is a target bit rate for a current frame.

17. The method of claim 15, wherein said allocating step (b) further comprises the step of:
(b3) allocating the coding bits in accordance with a local adjustment that accounts for a number of bits spent up to a present block.

18. The method of claim 17, wherein said local adjustment is expressed as:

$$\text{local\_adj} = k*(\text{actual\_bits\_spent\_so\_far} - \text{projection})/\text{bit-rate},$$

where k is a constant, actual_bits_spent_so_far is said number of bits spent up to the present macroblock, and projection is a number of bits that is projected to have been spent up to the present macroblock and bit-rate is a rate used to encode the image.

19. The method of claim 18, wherein said projection is expressed as:

$$\text{projection} = \frac{T}{\sum_{\text{all macroblocks}} w_i d_i^2} \sum_{i=0}^{\text{current macroblock}} w_i d_i^2$$

where $w_i$ is a weight for a macroblock i and $d_i$ is a distortion for said macroblock i.

20. The method of claim 8, wherein said obtaining importance information step (a) comprises the step of:
filling or purging said received importance information from said block classifier for detecting a skin-tone block.

21. An apparatus for allocating coding bits to a block within an image of an uncompressed input image sequence said apparatus comprising:
a block classifier for generating an importance map for indicating an importance information of at least one block within the image, where said importance information is generated by mapping a chrominance component of said at least one block in the image of the uncompressed input image sequence in a chrominance plane to detect a skin-tone block; and
a controller, coupled to said block classifier, for allocating coding bits to said block in accordance with said importance information.

22. The apparatus of claim 21, wherein said block classifier comprises:
at least one detector for classifying a block as a skin-tone block, an edge block, or a motion block; and
an importance map generator, coupled to said at least one detector, for generating said importance map.

23. A computer-readable medium having stored thereon a plurality of instructions, the plurality of instructions including instructions which, when executed by a processor, cause the processor to perform the steps comprising of:
(a) mapping a chrominance component of a block in the current image of an uncompressed input image sequence in a chrominance plane;
(b) defining a decision region by four straight lines in said chrominance plane; and
(c) classifying said block as a skin-tone block if said chrominance component falls within said decision region.

* * * * *

UNITED STATES PATENT AND TRADEMARK OFFICE
CERTIFICATE OF CORRECTION

PATENT NO.    : 6,275,614 B1
DATED         : August 14, 2001
INVENTOR(S)   : Krishnamurthy et al.

It is certified that error appears in the above-identified patent and that said Letters Patent is hereby corrected as shown below:

Column 11,
Line 40, please replace "(1)" with -- (b1) --.

Signed and Sealed this

Twenty-fourth Day of September, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,275,614 B1  Page 1 of 1
DATED : August 14, 2001
INVENTOR(S) : Krishnamurthy et al.

It is certified that error appears in the above-identified patent and that said Letters Patent is hereby corrected as shown below:

Column 11,
Line 40, please replace "(1)" with -- (b1) --.

Signed and Sealed this

Fifteenth Day of October, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO.   : 6,275,614 B1
DATED        : August 14, 2001
INVENTOR(S)  : Ravi Krishnamurthy and Sriram Sethuraman It is certified that error appears in the above-identified patent and that said Letters Patent is hereby corrected as shown below:

<u>Column 1,</u>
Line 39, after "between distinctive object", please add:
-- or objects that are moving from frame to frame. The ability to detect and exploit such regions of importance will greatly enhance an encoding system. --

Signed and Sealed this

Twenty-first Day of January, 2003

JAMES E. ROGAN
*Director of the United States Patent and Trademark Office*